(12) United States Patent
Ganapathy et al.

(10) Patent No.: US 10,089,977 B2
(45) Date of Patent: Oct. 2, 2018

(54) METHOD FOR SYSTEM COMBINATION IN AN AUDIO ANALYTICS APPLICATION

(71) Applicant: INTERNATIONAL BUSINESS MACHINES CORPORATION, Armonk, NY (US)

(72) Inventors: Sriram Ganapathy, Hartford, CT (US); Mohamed K. Omar, Chappaqua, NY (US); Robert Ward, Westchester, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 194 days.

(21) Appl. No.: 14/793,089

(22) Filed: Jul. 7, 2015

(65) Prior Publication Data

US 2017/0011734 A1    Jan. 12, 2017

(51) Int. Cl.
*G06F 17/20* (2006.01)
*G10L 15/00* (2013.01)
(Continued)

(52) U.S. Cl.
CPC .......... *G10L 15/005* (2013.01); *G10L 15/32* (2013.01); *G06F 17/275* (2013.01); *G10L 15/02* (2013.01); *G10L 15/18* (2013.01)

(58) Field of Classification Search
None
See application file for complete search history.

(56) References Cited

U.S. PATENT DOCUMENTS 5,689,616 A * 11/1997 Li ..................... G10L 15/005
704/232
5,754,978 A * 5/1998 Perez-Mendez ........ G10L 15/32
704/239

(Continued)

FOREIGN PATENT DOCUMENTS

WO    1992018946    10/1992

OTHER PUBLICATIONS

Hemant Misra et al, "New Entropy Based Combination Rules in HMM/ANN Multi-Stream ASR", ICASSP 2003, p. 741-744.*

(Continued)

*Primary Examiner* — Richard Zhu
(74) *Attorney, Agent, or Firm* — F. Chau & Associates, LLC

(57) ABSTRACT

Exemplary embodiments of the present invention provide a method of system combination in an audio analytics application including providing a plurality of language identification systems in which each of the language identification systems includes a plurality of probabilities. Each probability is associated with the system's ability to detect a particular language. The method of system combination in the audio analytics application includes receiving data at the language identification systems. The received data is different from data used to train the language identification systems. A confidence measure is determined for each of the language identification systems. The confidence measure identifies which language its system predicts for the received data and combining the language identification systems according to the confidence measures.

18 Claims, 5 Drawing Sheets

(51) Int. Cl.
   *G10L 15/32* (2013.01)
   *G10L 15/02* (2006.01)
   *G10L 15/18* (2013.01)
   *G06F 17/27* (2006.01)

(56) References Cited

U.S. PATENT DOCUMENTS

| | | | | |
|---|---|---|---|---|
| 5,805,771 | A * | 9/1998 | Muthusamy | G10L 15/005 704/231 |
| 6,122,613 | A * | 9/2000 | Baker | G10L 15/22 704/235 |
| 6,167,369 | A * | 12/2000 | Schulze | G06F 17/275 704/10 |
| 6,292,779 | B1 * | 9/2001 | Wilson | G10L 15/26 704/255 |
| 6,701,293 | B2 * | 3/2004 | Bennett | G10L 15/32 704/246 |
| 6,882,970 | B1 * | 4/2005 | Garner | G06F 17/30746 704/236 |
| 7,043,429 | B2 * | 5/2006 | Chang | G10L 15/32 704/236 |
| 7,228,275 | B1 * | 6/2007 | Endo | G10L 15/32 704/231 |
| 7,831,425 | B2 * | 11/2010 | Acero | G10L 15/05 704/231 |
| 7,917,361 | B2 * | 3/2011 | Li | G10L 15/005 704/231 |
| 8,655,817 | B2 | 2/2014 | Hasey et al. | |
| 2010/0004930 | A1 * | 1/2010 | Strope | G10L 15/32 704/240 |
| 2011/0071817 | A1 * | 3/2011 | Siivola | G06F 17/275 704/8 |
| 2013/0238336 | A1 * | 9/2013 | Sung | G10L 15/32 704/255 |
| 2015/0039317 | A1 * | 2/2015 | Klein | G10L 15/22 704/275 |
| 2015/0364129 | A1 * | 12/2015 | Gonzalez-Dominguez | G10L 15/005 704/251 |

OTHER PUBLICATIONS

Qifeng Zhu et al., "Tandem Connectionist Feature Extraction for Conversational Speech Recognition", SpringerVerlag Berlin Heidelberg 2005, p. 223-231.*

Javier Gonzalez-Dominguez et al., "Frame by frame language identification in short utterances using deep neural networks", Neural Netowkrs 64 (2015) pp. 49-58, available online Sep. 3, 2014.*

Misra, Hemant, Hervé Bourlard, and Vivek Tyagi, "New entropy based combination rules in HMM/ANN multi-stream ASR." Acoustics, Speech, and Signal Processing, 2003. Proceedings,(ICASSP'03). 2003 IEEE International Conference on. vol. 2. IEEE, 2003.

Campbell, William; et al, "Advanced language recognition using cepstra and phonotactics: MITLL system performance on the NIST 2005 language recognition evaluation," Speaker and Language Recognition Workshop. 2006. IEEE Odyssey 2006: IEEE, 2006.

Kinnunen, Tomi, and Haizhou Li. "An overview of text-independent speaker recognition: From features to supervectors" Speech communication 52.1 (2010): 12-40.

Nechaev, Y.; "Conception of neural network as competition computing technology of information processing in intelligence systems new generation"; Neurocomputers: Development and Application; No. 6; pp. 4-13, 2010.

Hoernicke, M. et al.; "System and Method for a Human Machine Interface based Automatic Generation of Process Simulation Models"; IP.com Electronic Publication, No. IPCOM000212470D, published Nov. 14, 2011.

Chessell, M. et al.; "Smarter Analytics: Taking the Journey to IBM Cognitive Systems"; Redguides, REDP-5043-00; published Oct. 1, 2013.

* cited by examiner

METHOD FOR SYSTEM COMBINATION IN AN AUDIO ANALYTICS APPLICATION

This invention was made with Government support under Contract No.: D11PC20192 awarded by Defense Advanced Research Projects Agency (DARPA). The Government has certain rights in this invention.

FIELD OF THE INVENTION

Exemplary embodiments of the present invention relate to a method for system combination. More particularly, exemplary embodiments of the present invention relate to a method for system combination in an audio analytics application.

DISCUSSION OF RELATED ART

Generally, in an audio analytics application such as language identification or recognition, a plurality of systems utilizing different features and models may each be used to generate respective views of audio data. Each system may arrive at a unique view regarding the audio data. The views of the audio data from some number of the plurality of systems may be combined to form a single decision. The combination of the views from the plurality of systems may be performed by training a logistic regression or a neural network model using development data to weight the relative value of each of the plurality of systems. For example, the decision may be whether the audio data includes an audio recording of a particular language or dialect such as English, French or German.

SUMMARY

Exemplary embodiments of the present invention provide a method of system combination in an audio analytics application including providing a plurality of language identification systems in which each of the language identification systems includes a plurality of probabilities. Each probability is associated with the system's ability to detect a particular language. The method of system combination in the audio analytics application includes receiving data at the language identification systems. The received data is different from data used to train the language identification systems. A confidence measure is determined for each of the language identification systems. The confidence measure identifies which language its system predicts for the received data. The language identification systems are combined according to the confidence measures.

According to an exemplary embodiment of the present invention the language identification systems may have different feature extraction methods from each other.

According to an exemplary embodiment of the present invention the language identification systems may have different modeling schemes from each other.

According to an exemplary embodiment of the present invention the language identification systems may have different noise removal schemes from each other.

According to an exemplary embodiment of the present invention the received data and the data used to train the language identification systems may include speech.

According to an exemplary embodiment of the present invention the received data may include an utterance.

According to an exemplary embodiment of the present invention the confidence measure for each of the language identification systems may include an inverse entropy value.

The inverse entropy value may be based on a number of languages the system can detect and the probabilities of the system.

According to an exemplary embodiment of the present invention the language identification systems may be combined by normalizing the inverse entropy value.

According to an exemplary embodiment of the present invention the steps of determining the confidence measure and combining the language identification systems may be repeated for each utterance in the received data.

According to an exemplary embodiment of the present invention the receive data may have different characteristics than the data used to train the language identification systems.

According to an exemplary embodiment of the present invention the confidence measure may be used to identify which of the plural systems performs the best on the received data.

According to an exemplary embodiment of the present invention the combination of confidence measures may be applied to the received data to increase a performance metric of the language identification systems.

According to an exemplary embodiment of the present invention the performance metric may be indicative of accuracy in detecting language.

Exemplary embodiments of the present invention provide a method of system combination in an audio analytics application including providing a plurality of language identification systems in which each of the language identification systems includes a plurality of probabilities. Each probability is associated with the system's ability to detect a particular language. Data is received at the language identification systems. The received data has different characteristics than data used to train the language identification systems. A confidence measure is determined for each of the language identification systems using a portion of the received data. The confidence measure identifies which language its system predicts for the received data. At least two of the language identification systems are combined according to the confidence measures.

According to an exemplary embodiment of the present invention the portion of the received data used to determine the confidence measure may be less than 10% of the received data.

According to an exemplary embodiment of the present invention less than all of the language identification systems may be combined according to the confidence measures.

According to an exemplary embodiment of the present invention the at least two language identification systems may be combined before pruning the language identification systems based on their confidence measures.

Exemplary embodiments of the present invention provide a method of system combination in an audio analytics application including providing a plurality of language identification systems trained on first data. A second data is received at the language identification systems. The second data is different from the first data. A confidence measure is determined for each of the language identification systems. The confidence measure identifies which language its system predicts for the received data. The language identification systems according to the confidence measures are combined. A third data different from the first and second data is input to the combination of language identification systems. A language of the third data is identified.

According to an exemplary embodiment of the present invention each of the language identification systems may include a plurality of probabilities. Each probability may be associated with the system's ability to detect a particular language.

According to an exemplary embodiment of the present invention the confidence measure for each of the language identification systems may include an inverse entropy value. The inverse entropy value may be based on a number of languages the system can detect and the probabilities of the system.

BRIEF DESCRIPTION OF THE FIGURES

The above and other features of the present invention will become more apparent by describing in detail exemplary embodiments thereof, with reference to the accompanying drawings, in which.

DETAILED DESCRIPTION

Figure 1:
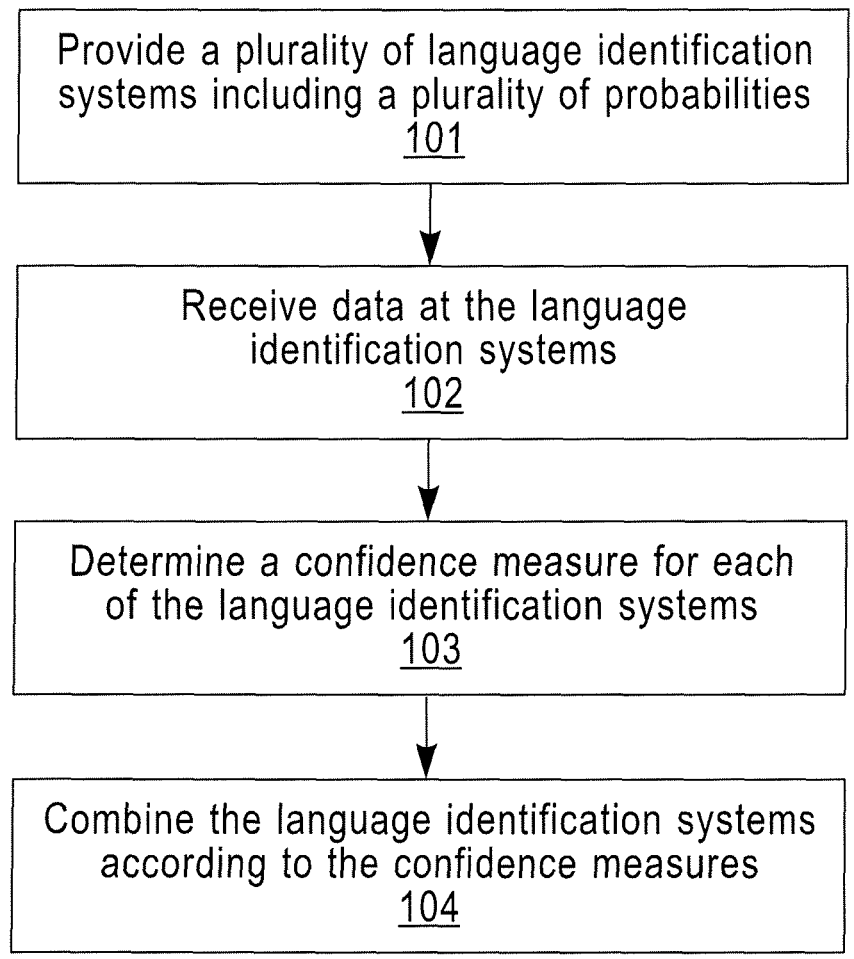
FIG. 1 is a flow chart of a method of system combination in an audio analytics application according to exemplary embodiments of the present invention.

Combining language identification systems in an audio analytics application may include a probability for each of the language identification systems. The probability for each language identification system may reflect the accuracy of each language identification system in detecting the presence of a particular language included in audio data. By more heavily weighting higher probability language identification systems in a combination step, an accuracy of language identification may be increased.

Combining language identification systems having different probabilities may be performed by training a logistic regression or neural network model using development data and then applying the resulting weights to each of the language identification systems when the language identification systems are combined. However, the development data used to train the combination model does not necessarily match the data encountered in a real world (e.g., test data) audio analytics scenario. In other words, the probability for each respective language identification system in a training scenario might not be the same or similar to actual probabilities for the language identification systems in a real world setting. Thus, less accurate language identification systems may be weighted more heavily, and the accuracy of language identification may be reduced. According to an exemplary embodiment of the present invention, a method of system combination in an audio analytics application includes an adaptive system combination scheme based on confidence measures of test data.

According to an exemplary embodiment of the present invention, the system(s) with the highest confidence alone can be retained and the low confidence system can be pruned out by rank ordering the confidence measure obtained from samples of the test data. According to an exemplary embodiment of the present invention retaining a single system out of a number of plural systems using the confidence measure may increase the speed of the overall system.

In a low power, high speed deployment of the language identification system on test data, which do not match the training data, the adaptive confidence measurement on a few utterances (e.g., 5-10 utterances) of the test data may prompt a single choice of a language identification system which performs better than the rest of the language identification systems. For the remainder of the test data, this language identification system alone may be run and the rest of the language identification systems may be pruned out. According to an exemplary embodiment of the present invention, this may increase the speed of data processing.

An utterance may be a spoken word, phrase, sentence or a group of sentences. An utterance according to exemplary embodiments of the present invention may be an audio file. The audio file may be recorded from at least one speaker. For example, the utterance may be a recording of one side of a telephone conversation between two or more parties or may be the audio recording from a lavalier microphone coupled to a speaker. According to an exemplary embodiment of the present invention, several utterances may be recorded from a single language and/or channel. For example, a single channel (e.g., recording device) may be used to collect about 1,000 utterances including some number of (e.g., several hundred) utterances belonging to each of the target languages of interest.

FIG. 1 is a flow chart of a method of system combination in an audio analytics application according to exemplary embodiments of the present invention.

Referring to FIG. 1, a method of system combination in an audio analytics application may include providing a plurality of language identification systems in which each of the language identification systems includes a plurality of probabilities 101. Each probability may be associated with the system's ability to detect a particular language. The method may include receiving data at the language identification systems 102. The received data may be different from data used to train the language identification systems. A confidence measure may be determined for each of the language identification systems 103. The confidence measure may identify which language its system is best at detecting. The language identification systems may be combined according to the confidence measures 104.

For example, if one or more of the language identification systems is found to be relatively inaccurate in predicting one or more languages included in test data, the inaccurate system may be pruned out and more accurate systems may be more heavily weighted when the language identification systems are combined. Thus, the method of system combination in the audio analytics application including the adaptive system combination scheme based on confidence measures of test data may increase accuracy of language recognition and identification in an environment with noisy or mismatched data. For example, by pruning out some or all except one of the systems, the computation may be achieved in less time while using fewer computational resources.

According to an exemplary embodiment of the present invention, the method of system combination in the audio analytics application including the adaptive system combination scheme based on confidence measures of test data may be performed by an unsupervised system evaluating unlabeled test data. Labeled data may refer to audio data in which a spoken or recorded language is known. Unlabeled data may refer to audio data in which the spoken or recorded language is unknown.

According to exemplary embodiments of the present invention, the individual language identification systems may each employ different language identification approaches. For example, the individual language identification systems may each include one or more of: diverse feature extraction methods from a speech signal (e.g., using short spectral slices or long-term summarization of speech); different modeling schemes (e.g., support vector machines or deep neural networks); and/or different noise removal schemes (e.g., pre-filtering of noise, spectral subtraction or frequency offset correction). According to an exemplary embodiment of the present invention the language identification systems may have different feature extraction methods and/or may have different modeling schemes from each other.

According to an exemplary embodiment of the present invention the received data and the data used to train the language identification systems may include speech. For example, the speech may include one or more languages or one or more dialects, such as French, Spanish, German, Arabic, Farsi or Urdu. According to an exemplary embodiment of the present invention the received data may include an utterance. A plurality of utterances may be received and each utterance may be individually evaluated by each language identification system. According to an exemplary embodiment of the present invention the steps of determining the confidence measure and combining the language identification systems may be repeated for each utterance in the received data. According to an exemplary embodiment of the present invention, the confidence measure obtained from processing a few initial utterances can be used to prune out a subset of the language identification systems for the remainder of the utterances in the test data.

Figure 2A:
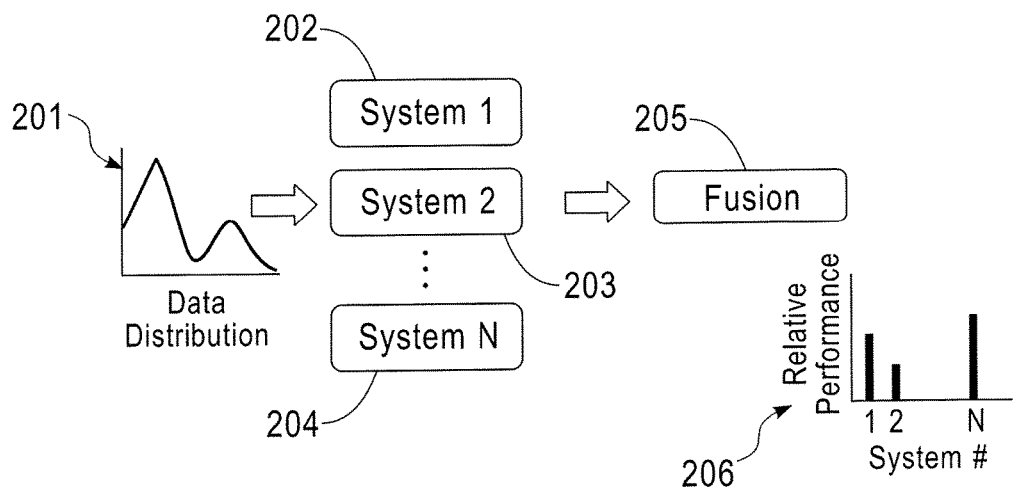
FIG. 2A is a diagram illustrating system combination training and relative performance of individual language identification systems in an audio analytics application without confidence estimation according to exemplary embodiments of the present invention.

FIG. 2A is a diagram illustrating system combination training and relative performance of individual language identification systems in an audio analytics application without confidence estimation according to exemplary embodiments of the present invention.

Figure 2B:
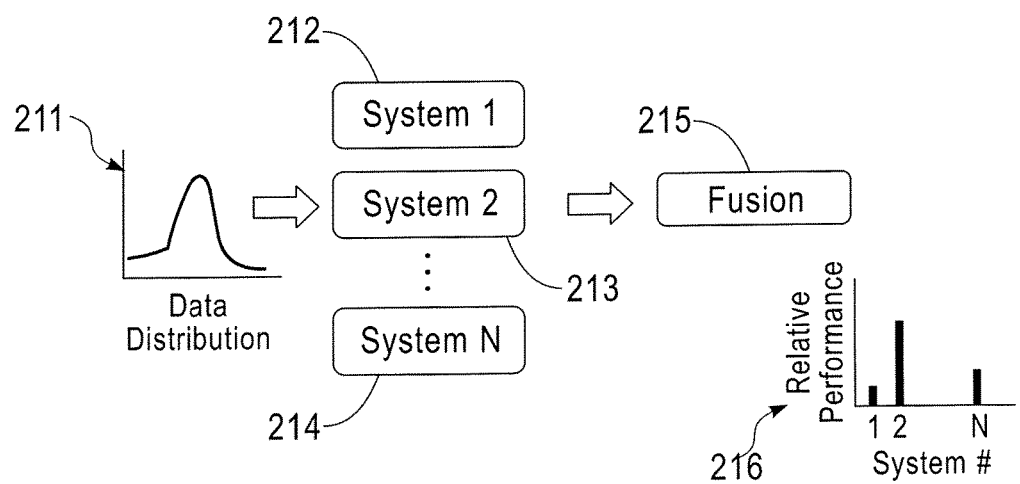
FIG. 2B is a diagram illustrating system combination evaluation and relative performance of individual language identification systems in an audio analytics application without confidence estimation according to exemplary embodiments of the present invention.

FIG. 2B is a diagram illustrating system combination evaluation and relative performance of individual language identification systems in an audio analytics application without confidence estimation according to exemplary embodiments of the present invention.

Referring to FIGS. 2A and 2B, System 1, System 2 . . . System N may each refer to different language identification systems. Each of the language identification systems may employ a unique machine learning model and/or a different feature extraction step for language identification. For example, neural network based models or support vector machines may be used by each of the individual language identification systems.

Referring to FIG. 2A, training audio data 201 having a particular data distribution may be received by each of a first language identification system 202, a second language identification system 203 . . . to an Nth language identification system 204. The training audio data 201 may be labeled data in which the language is known. The training audio data 201 may be used to train the language identification systems 202, 203 and 204. The trained language identification systems 202, 203 and 204 may then undergo a fusion 205 in which language identification decisions of the trained language identification systems 202, 203 and 204 are combined. The fusion 205 of the trained language identification systems 202, 203 and 204 may be performed based on a relative performance 206 (e.g., language identification accuracy) of each of the language identification systems 202, 203 and 204.

Referring to FIG. 2B, test audio data 211 having a particular data distribution may be received by each of a first language identification system 212, a second language identification system 213 . . . to an Nth language identification system 214. The test audio data 211 may have a different data distribution than that of the training audio data 201. The language identification systems 212, 213 and 214 may each form views (e.g., language identification) of the test audio data 211, and the views of each of the language identification systems 212, 213 and 214 may then undergo a fusion 215 in which language identification views of the trained language identification systems 212, 213 and 214 are combined. The relative weights of the views of the language identification systems 212, 213 and 214 may be based on the relative weights applied during system training (see, e.g., FIG. 2A). However, a relative performance 216 (e.g., language identification accuracy) of the language identification systems 212, 213 and 214 may be different than the relative performance 206 (e.g., language identification accuracy) of the language identification systems 202, 203 and 204 because the data distribution of the test audio data 211 may be different than the data distribution of the training audio data 201. Thus, a fused impression of the test audio data 211 may be relatively less accurate at predicting languages included in the test audio data 211.

Figure 3:
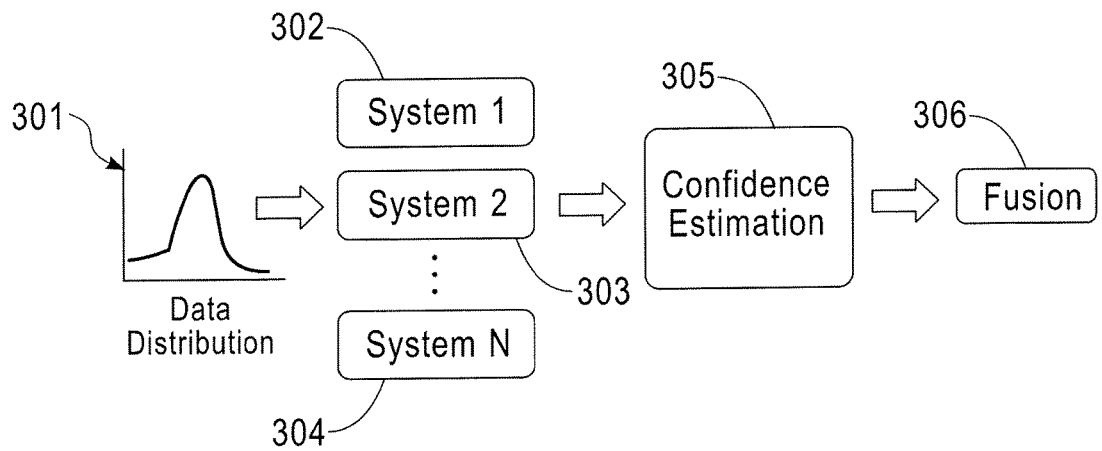
FIG. 3 is a diagram illustrating language identification systems combination in an audio analytics application with confidence estimation according to exemplary embodiments of the present invention.

FIG. 3 is a diagram illustrating system combination in an audio analytics application with confidence estimation according to exemplary embodiments of the present invention.

Referring to FIG. 3 test audio data 301 having a particular data distribution may be received by each of a first language identification system 302, a second language identification system 303 . . . to an Nth language identification system 304. The language identification systems 302, 303 and 304 may each form views (e.g., language identification) of the test audio data 301. The views of each of the language identification systems 302, 303 and 304 may then undergo confidence estimation 305. The confidence estimation 305 (discussed below in more detail) may determine the relative performance (e.g., language identification accuracy) of the language identification systems 302, 303 and 304 to determine fusion weights for each of the language identification systems 302, 303 and 304. The views of each of the language identification systems 302, 303 and 304 may then undergo a fusion 306 in which language identification views of the trained language identification systems 302, 303 and 304 are combined based on the fusion weights determined by the confidence estimation 305. The relative weights applied during the fusion 306 may be adaptively obtained from the test audio data 301 and not from training data, which might not match the test data distribution. Thus, the fused impression of the test data 301 may be relatively more accurate at predicting a language included in the test audio data 301.

Exemplary confidence estimates and exemplary relative weights for a plurality of language identification systems are illustrated below in Table 1. With reference to the exemplary scenario illustrated in Table 1, System B may be relatively more accurate at identifying a language and therefore System B may be more heavily weighted when combining the language identification systems illustrated in Table 1. If the confidence measurement is done with a few utterances from the test data, System B alone, for example, can be run on a remainder of the test data and the rest of the systems can be pruned out, which may save computational effort or resources. Pruning of the systems may be performed when the distribution of the test data obtained from a few utterances remains consistent throughout the testing period.

TABLE 1

| Language Identification System | Confidence Estimate | Relative Weight |
|---|---|---|
| System A | 20% | 0.2 |
| System B | 50% | 0.5 |
| System C | 25% | 0.25 |
| System D | 5% | 0.05 |

Confidence Estimation

In the language recognition methods according to exemplary embodiments of the present invention, neural network based models or support vector machines may be used for each of the individual language identification systems. According to an exemplary embodiment of the present invention the confidence measure for each of the language identification systems may include an inverse entropy value. The language identification systems may be combined by weighting and summing the normalized inverse entropy values of the individual systems. The inverse entropy value may be based on a number of languages the system can detect and the probabilities of the system. For example, language identification systems may be proportionally weighted according to their confidence measure, which is discussed below in more detail.

According to exemplary embodiments of the present invention, confidence estimation may be based on the inverse entropy of the posterior probability distribution from each individual language identification system that a test data utterance consisting of speech from a particular language. An individual language identification system determining with a relatively high probability that the audio utterance of interest comes from a particular known language is included in audio data may have a relatively high inverse entropy score (e.g., the uncertainty in the individual language identification system's predictive measurement is relatively low). Alternatively, an individual language identification system determining that the test data utterance comes from all known languages with equal probability and that no particular known language has a relatively high probability may have a relatively low inverse entropy score (e.g., the uncertainty in the individual language identification system's predictive measurement is relatively high). For example, in labeled audio data which is known to contain an audio recording of spoken Chinese, a first language identification system determining with a relatively high probability that Chinese is spoken would receive a relatively high inverse entropy score, while a second language identification system determining that any known language could be spoken in the audio data with equal probability would receive a relatively low inverse entropy score. Thus, the confidence estimation for the first language identification system would be relatively high and the confidence estimation for the second language identification system would be relatively low, and the first language identification system would be more heavily weighted during the combination step (e.g., the fusion step illustrated in FIG. 3).

Adaptive System Combination

Entropy may be defined as:

$$E(p) = -\Sigma_{k=1}^{K} p_k \log(p_k)$$

K may be the number of languages in the audio data. Pi may refer to normalized language scores from individual language identification systems, which may be interchangeably referred to as probabilities. The inverse entropy may be a measurement of the confidence of the language identification system in predicting languages included in test audio data (e.g., the language included in each test utterance).

A combination score (e.g., combination estimate) of K systems may be defined as:

$$S = \Sigma_{k=1}^{K} p_k / E'(p_k).$$

$E'(p_k)$ may be the normalized entropy normalized over the K systems.

According to an exemplary embodiment of the present invention the confidence measure may be used to identify which of the plural systems performs the best on the received data. This may allow a decision to be made to switch off the rest of the systems on the received data having similar characteristics thereby reducing computational costs.

Confidence estimation and adaptive system combination is discussed in more detail in Misra, Hemant, Hervé Bourlard, and Vivek Tyagi. "New entropy based combination rules in HMM/ANN multi-stream ASR."*Acoustics, Speech, and Signal Processing,* 2003. *Proceedings.* (*ICASSP'*03). 2003 *IEEE International Conference on.* Vol. 2. IEEE, 2003, the disclosure of which is incorporated by reference herein in its entirety.

Exemplary System Combination Performance

Figure 4:
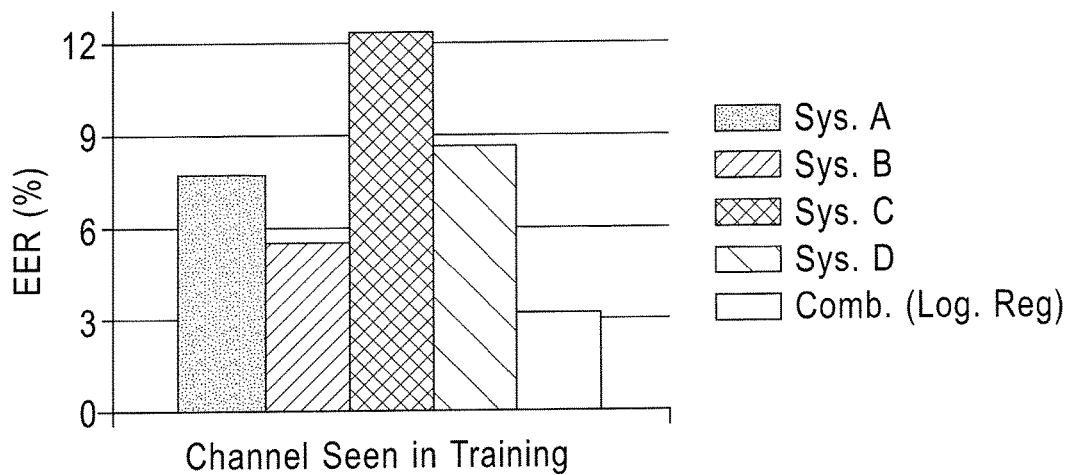
FIG. 4 is a graph illustrating equal error rate (EER) of a logistic regression model of combining language identification systems when training data match test data.
Figure 5:
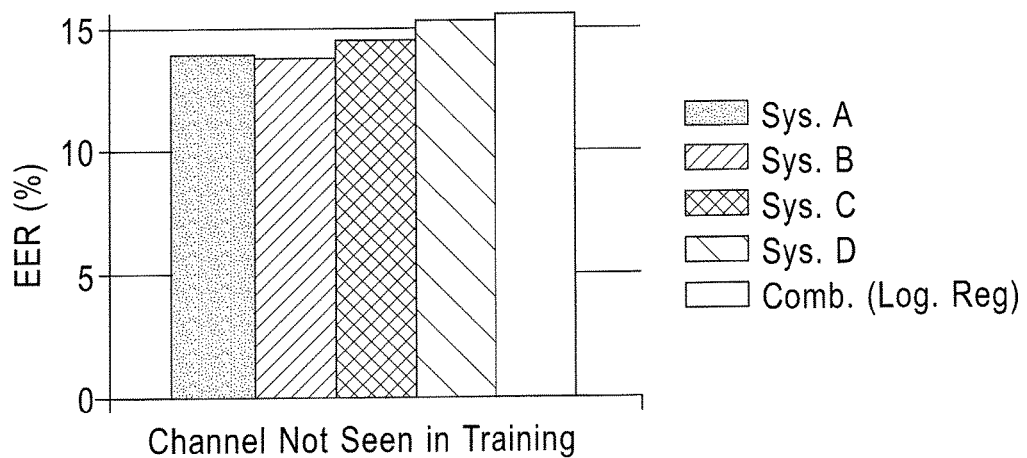
FIG. 5 is a graph illustrating equal error rate (EER) of a logistic regression model of combining language identification systems when training data do not match test data.
Figure 6:
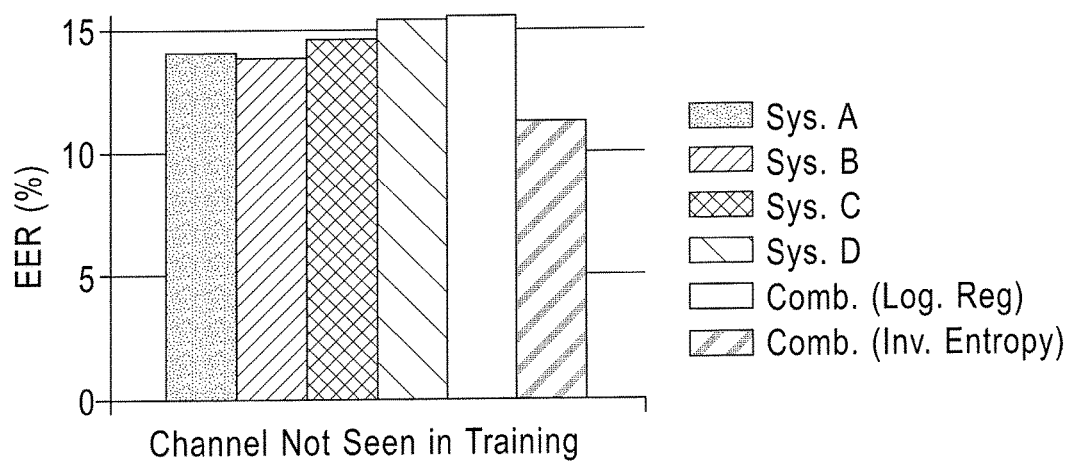
FIG. 6 is a graph illustrating equal error rate (EER) of an adaptive framework method of combining language identification systems using inverse entropy when training data do not match test data according to an exemplary embodiment of the present invention.

FIG. 4 is a graph illustrating equal error rate (EER) of a logistic regression model of combining language identification systems when training data match test data. FIG. 5 is a graph illustrating equal error rate (EER) of a logistic regression model of combining language identification systems when training data do not match test data. FIG. 6 is a graph illustrating equal error rate (EER) of an adaptive framework method of combining language identification systems using inverse entropy when training data do not match test data according to an exemplary embodiment of the present invention.

With regard to FIGS. 4 to 6, an equal error rate (EER) is a measure of the relative performance of the language identification systems. A relatively low EER may indicate that a language identification system is predicting a language included in audio data relatively accurately. Alternatively, a relatively high EER may indicate that a language identification system is predicting a language included in audio data relatively inaccurately. Inaccurate language prediction may result from wrongly predicting an utterance to belong to a particular language (e.g., a false alarm error). For example, a Spanish speech utterance may be wrongly identified as French, which may result in a false alarm error for French language. Inaccurate language prediction may result from failing to identify a language present in audio data (e.g., a miss error). For example, the language identification system may fail to identify Spanish when Spanish language identification is desired. The language identification systems may or might not accurately predict a language spoken in a particular utterance.

Referring to FIG. 4, a number of language identification systems (e.g., Sys. A, Sys. B, Sys. C and Sys D) and a combined language identification system may be evaluated to determine the EER for each system, as well as the EER resulting from system combination by the logistic regression model. As illustrated in FIG. 4, combining the four language identification systems by a logistic regression method when the training data matches the test data distribution may result in a relatively low EER. In other words, the combined language identification system may be more accurate in identifying a language than each of the individual language identification systems if the distribution of training data and test data match.

Referring to FIG. 5, the language identification systems (e.g., Sys. A, Sys. B, Sys. C and Sys D) and the combined language identification system may be evaluated to determine the EER for each system, as well as the EER resulting from system combination by the logistic regression model. As illustrated in FIG. 5, combining the four language identification systems by a logistic regression method when the training data distribution does not match the test data distribution may result in a relatively high EER. In other words, the combined language identification system may be less accurate in identifying a language than each of the individual language identification systems when the training data do not match the test data. This scenario may occur in a naturally occurring or real world situation which was not precisely represented in the training scheme.

Referring to FIG. 6, the language identification systems (e.g., Sys. A, Sys. B, Sys. C and Sys D) and the combined language identification system may be evaluated to determine the EER for each system, as well as the EER resulting from system combination by the logistic regression model and the EER resulting from the adaptive framework method according to exemplary embodiments of the present invention. As illustrated in FIG. 6, combining the four language identification systems by a logistic regression method when training data distribution does not match test data distribution may result in a relatively high EER. However, combining the four language identification systems by the adaptive framework method when training data distribution does not match test data distribution may result in a relatively low EER. In other words, the adaptive framework method combined language identification system may be more accurate in identifying languages than each of the individual language identification systems and may be more accurate than the logistic regression method when the training data distribution does not match the test data distribution. For example, as illustrated in FIG. 6, the adaptive framework method combined language identification system may be 25% more accurate in identifying languages than the logistic regression method. In addition to a reduced EER in the adaptive framework method of combining language identification systems, the adaptive method according to exemplary embodiments of the present invention may be relatively faster than the logistic regression method. For example, by pruning out the systems which have a low confidence, the adaptive method may be 4 times faster than the logistic regression method.

Figure 7:
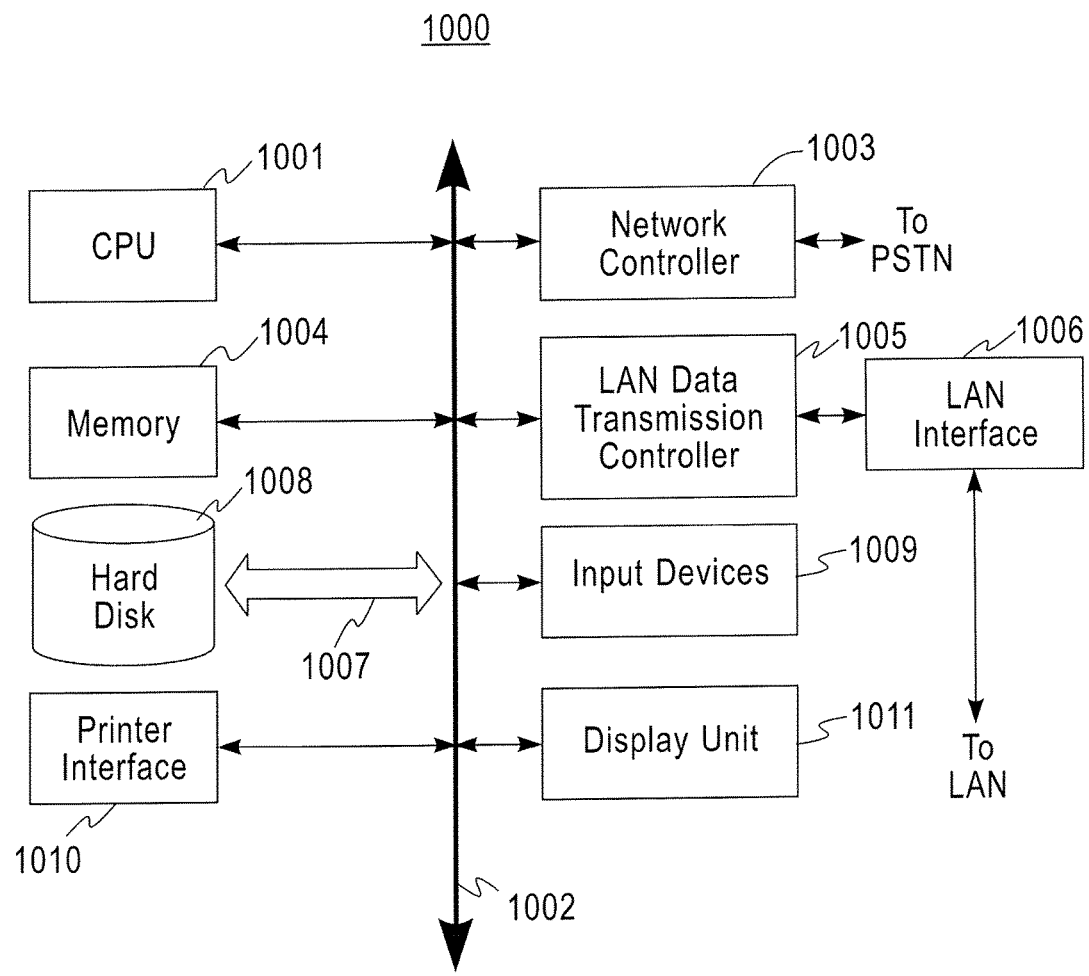
FIG. 7 illustrates an example of a computer system capable of implementing the method and apparatus according to embodiments of the present disclosure.

FIG. 7 illustrates an example of a computer system capable of implementing the method and apparatus according to embodiments of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The descriptions of the various exemplary embodiments of the present invention have been presented for purposes of illustration, but are not intended to be exhaustive or limited to the exemplary embodiments disclosed. Many modifications and variations will be apparent to those of ordinary skill in the art without departing from the scope and spirit of the described exemplary embodiments. The terminology used herein was chosen to best explain the principles of the exemplary embodiments, or to enable others of ordinary skill in the art to understand exemplary embodiments described herein.

The flowcharts and/or block diagrams in the figures illustrate the architecture, functionality, and operation of possible implementations of systems, methods, and computer program products according to various exemplary embodiments of the inventive concept. In this regard, each block in the flowchart or block diagrams may represent a module, segment, or portion of instructions, which comprises one or more executable instructions for implementing the specified logical function(s). In alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of system combination in an audio analytics application, comprising:
   providing a plurality of language identification systems, wherein each of the language identification systems includes a plurality of probabilities, wherein each probability is associated with the system's ability to detect a particular language;

receiving data at the language identification systems, wherein the received data is different from data used to train the language identification systems;

determining a confidence measure for each of the language identification systems, wherein the confidence measure identifies a level of accuracy for each of the language identification systems at predicting a presence of the particular language in the received data based on an inverse entropy of a posterior probability distribution of each of the language identification systems, wherein the inverse entropy of the posterior probability of each of the language identification systems is based on a number of languages each of the language identification systems can identify and the plurality of probabilities of each of the language identification systems;

rank ordering each of the language identification systems based on the confidence measure; and combining a subset of the language identification systems having confidence measures above a predetermined threshold.

2. The method of claim 1, wherein the language identification systems have different feature extraction methods from each other.

3. The method of claim 1, wherein the language identification systems have different modeling schemes from each other.

4. The method of claim 1, wherein the language identification systems have different noise removal schemes from each other.

5. The method of claim 1, wherein the received data and the data used to train the language identification systems include speech.

6. The method of claim 1, wherein the received data includes an utterance.

7. The method of claim 1, wherein determining a confidence measure for each of the language identification systems includes normalizing the inverse entropy value for each of the language identification systems.

8. The method of claim 1, wherein the steps of determining the confidence measure and combining the language identification systems are repeated for each utterance in the received data.

9. The method of claim 1, wherein the received data has different characteristics than the data used to train the language identification systems.

10. The method of claim 1, further comprising using the confidence measure to identify which language its system is best at detecting in the received data.

11. The method of claim 1, further comprising applying the combination of confidence measures to the received data to increase a performance metric of the language identification systems.

12. The method of claim 11, wherein the performance metric is indicative of accuracy in detecting language.

13. A method of system combination in an audio analytics application, comprising:

providing a plurality of language identification systems, wherein each of the language identification systems includes a plurality of probabilities, wherein each probability is associated with the system's ability to detect a particular language;

receiving data at the language identification systems, wherein the received data has different characteristics than data used to train the language identification systems;

determining a confidence measure for each of the language identification systems using a portion of the received data, wherein the confidence measure identifies a level of accuracy for each of the language identification systems at predicting a presence of the particular language in the received data based on an inverse entropy of a posterior probability distribution of each of the language identification systems, wherein the inverse entropy of the posterior probability of each of the language identification systems is based on a number of languages each of the language identification systems can identify and the plurality of probabilities of each of the language identification systems; and combining at least two of the language identification systems having confidence measures above a predetermined threshold.

14. The method of claim 13, wherein the portion of the received data used to determine the confidence measure is less than 10% of the received data.

15. The method of claim 13, wherein less than all of the language identification systems are combined according to the confidence measures.

16. The method of claim 13, further comprising, before combining the at least two language identification systems, pruning the language identification systems based on their confidence measures.

17. A method of system combination in an audio analytics application, comprising:

providing a plurality of language identification systems trained on first data;

receiving a second data at the language identification systems, wherein the second data is different from the first data;

determining a confidence measure for each of the language identification systems, wherein the confidence measure identifies a level of accuracy for each of the language identification systems at predicting a presence of a particular language in the received data based on an inverse entropy of a posterior probability distribution of each of the language identification systems, wherein the inverse entropy of the posterior probability of each of the language identification systems is based on a number of languages each of the language identification systems can identify and a plurality of probabilities of each of the language identification systems;

combining a subset of the language identification systems having confidence measures above a predetermined threshold;

inputting third data different from the first and second data to the combination of language identification systems; and identifying a language of the third data.

18. The method of claim 17, wherein each of the language identification systems includes the plurality of probabilities, wherein each probability is associated with the system's ability to detect the particular language.

* * * * *